United States Patent
Parent

(10) Patent No.: US 10,740,216 B1
(45) Date of Patent: Aug. 11, 2020

(54) AUTOMATIC BUG CLASSIFICATION USING MACHINE LEARNING

(71) Applicant: Amazon Technologies, Inc., Seattle, WA (US)

(72) Inventor: Gershon Parent, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 15/633,171

(22) Filed: Jun. 26, 2017

(51) Int. Cl.
*G06F 11/36* (2006.01)
*G06N 20/00* (2019.01)

(52) U.S. Cl.
CPC ............ *G06F 11/362* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,266,788 B1 * | 7/2001 | Othmer | ............... | G06F 11/3636 |
| | | | | 707/999.202 |
| 6,742,141 B1 * | 5/2004 | Miller | ................. | G06F 11/0748 |
| | | | | 706/45 |
| 7,614,043 B2 * | 11/2009 | Ognev | .................. | G06F 11/366 |
| | | | | 706/12 |
| 9,176,843 B1 * | 11/2015 | Ismael | ................. | G06F 11/362 |
| 9,262,296 B1 * | 2/2016 | Soeder | ................ | G06F 11/3604 |
| 9,959,276 B2 * | 5/2018 | Soeder | .................... | G06F 11/36 |
| 2007/0074149 A1 * | 3/2007 | Ognev | .................. | G06F 11/366 |
| | | | | 717/101 |
| 2008/0127103 A1 * | 5/2008 | Bak | ........................ | G06F 9/451 |
| | | | | 717/126 |
| 2013/0014084 A1 * | 1/2013 | Sahibzada | ............. | G06F 11/327 |
| | | | | 717/124 |
| 2015/0082277 A1 * | 3/2015 | Champlin-Scharff | ...................... | |
| | | | | G06F 11/368 |
| | | | | 717/120 |
| 2015/0178634 A1 * | 6/2015 | Chen | ....................... | G06F 11/36 |
| | | | | 706/12 |

(Continued)

OTHER PUBLICATIONS

Ceylan, Evren, F. Onur Kutlubay, and Ayse B. Bener. "Software defect identification using machine learning techniques." 32nd EUROMICRO Conference on Software Engineering and Advanced Applications (EUROMICRO'06). IEEE, 2006. (Year: 2006).*

(Continued)

*Primary Examiner* — Matthew J Brophy
(74) *Attorney, Agent, or Firm* — Lee & Hayes, P.C.

(57) ABSTRACT

A machine learning engine can be used to identify inconsistencies and errors in a plurality of bug reports and to glean new information from the bug reports. Bug data associated with a large number of bug reports from different bug categories may be processed and used by a machine learning model of the machine learning engine. The machine learning engine can extract bug attributes from the bug data of a first bug. The machine learning engine can then compare the attributes of the first bug to a machine learning model created using a plurality of second bug reports. Based on then similarity between the first bug report and the second bug reports, the machine learning engine can apply, or correct, various attributes of the first bug report. The machine learning model may be updated over time by the machine learning engine as data correlations evolve.

20 Claims, 10 Drawing Sheets

(56) References Cited

U.S. PATENT DOCUMENTS

| | | | |
|---|---|---|---|
| 2015/0278526 A1* | 10/2015 | Bhattacharya | G06F 11/3692 726/1 |
| 2016/0004627 A1* | 1/2016 | Farchi | G06F 11/3616 717/127 |
| 2016/0246800 A1* | 8/2016 | Soeder | G06F 16/188 |
| 2016/0292069 A1* | 10/2016 | Farchi | G06F 11/3692 |
| 2016/0299838 A1* | 10/2016 | Farchi | G06N 20/00 |
| 2017/0060732 A1* | 3/2017 | Golfieri | G06F 11/3664 |
| 2017/0083428 A1* | 3/2017 | Champlin-Scharff | G06F 9/451 |
| 2017/0103344 A1* | 4/2017 | Cooper | H04L 43/04 |
| 2017/0199803 A1* | 7/2017 | Bagal | G06F 11/3692 |
| 2018/0052762 A1* | 2/2018 | Vyas | G06F 11/3668 |
| 2018/0081784 A1* | 3/2018 | Rivera | G06F 11/3624 |
| 2018/0107583 A1* | 4/2018 | Champlin-Scharff | G06F 9/451 |
| 2018/0121316 A1* | 5/2018 | Ismael | G06F 11/36 |
| 2018/0157670 A1* | 6/2018 | Soeder | G06F 21/562 |
| 2018/0267886 A1* | 9/2018 | Durga | G06F 11/3604 |
| 2018/0276562 A1* | 9/2018 | Woulfe | G06N 20/00 |
| 2018/0300227 A1* | 10/2018 | Bergen | G06F 11/079 |

OTHER PUBLICATIONS

Moparthi, A. Nageswara Rao, and B. Dr N. Geethanjali. "Design and implementation of hybrid phase based ensemble technique for defect discovery using SDLC software metrics." 2016 2nd Int.Conf. on Advances in Electrical, Electronics, Information, Communication and Bio-Informatics (AEEICB). IEEE. (Year: 2016).*

Prakash, V. Ajay, D. V. Ashoka, and VN Manjunath Aradya. "Application of data mining techniques for defect detection and classification." Proceedings of the 3rd International Conference on Frontiers of Intelligent Computing: Theory and Applications (FICTA) 2014. Springer, Cham, 2015. (Year: 2015).*

Sharma, Meera, et al. "Predicting the priority of a reported bug using machine learning techniques and cross project validation." 2012 12th International Conference on Intelligent Systems Design and Applications (ISDA). IEEE, 2012. (Year: 2012).*

* cited by examiner

600

602

Error Code 0200 -- Excessive current draw Motor 2- caused freezeframe data to be captured.

Motor 1 RPM -- 7283   Motor 1 Current -- 2.7A
Motor 2 RPM -- 0      Motor 2 Current -- 20.2A
Motor 3 RPM -- 7302   Motor 3 Current -- 2.6A
Motor 4 RPM - 7292    Motor 4 Current -- 2.7A
Battery Temp. -- 42C
Battery Voltage -- 39.8V
Ground Speed -- 23 mph
Location - 33.7881771,-84.3271724

604a

604

| Project Name | UAV1 |
| Team | Systems Integration |
| Reported By | RRE |
| Brief Description | Crash |
| Fix found? | Yes |
| Fix | Controller Update |
| Parts Cost | $0 |
| Time to Fix | 1.6 Hrs. |
| Cost to Fix | $160 |

[ Save ]  [ Clear ]  [ Attach ]

AUTOMATIC BUG CLASSIFICATION USING MACHINE LEARNING

BACKGROUND

In any type of manufacturing or development, identifying problems early in the manufacturing process is beneficial. Identifying a misfit between parts at the computer aided design (CAD) stage, for example, is much more efficient—i.e., less expensive and time consuming—than at the prototype stage. Changing a dimension in a CAD file, for example, is much easier and less expensive than redesigning a part that is already in production. This is especially true of complex modern products that may include electronic, mechanical, and software components, for example, where one component failure can have multiple implications.

The costs of development, however, must be balanced against the cost of issues that arise at various stages of manufacturing. In other words, the profit of a product can be largely, or entirely, consumed by excessive validation, data gathering, and testing processes during development. Thus, while the near total elimination of conflicts can be achieved with enough instrumentation, simulation, validation, etc., the cost of "perfect" development is prohibitive. Thus, the costs of development must be balanced against the costs of potential problems, bearing in mind that, generally, a problem identified later in development is costlier than one identified early in development.

To this end, identifying problems efficiently, and as early in the process as possible, is useful. A software conflict identified at the coding stage, for example, can often be resolved with a few keystrokes. Identifying the same software conflict at a later stage, such as during real-world testing, can increase costs exponentially. This is because, instead of a simple code rewrite, other systems may be implicated that require redesign, retooling, component replacement, and other costly solutions in addition to fixing the code.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is an example of a graphical user interface (GUI) for recording bug reports, in accordance with some examples of the present disclosure.

DETAILED DESCRIPTION

Figure 1A:
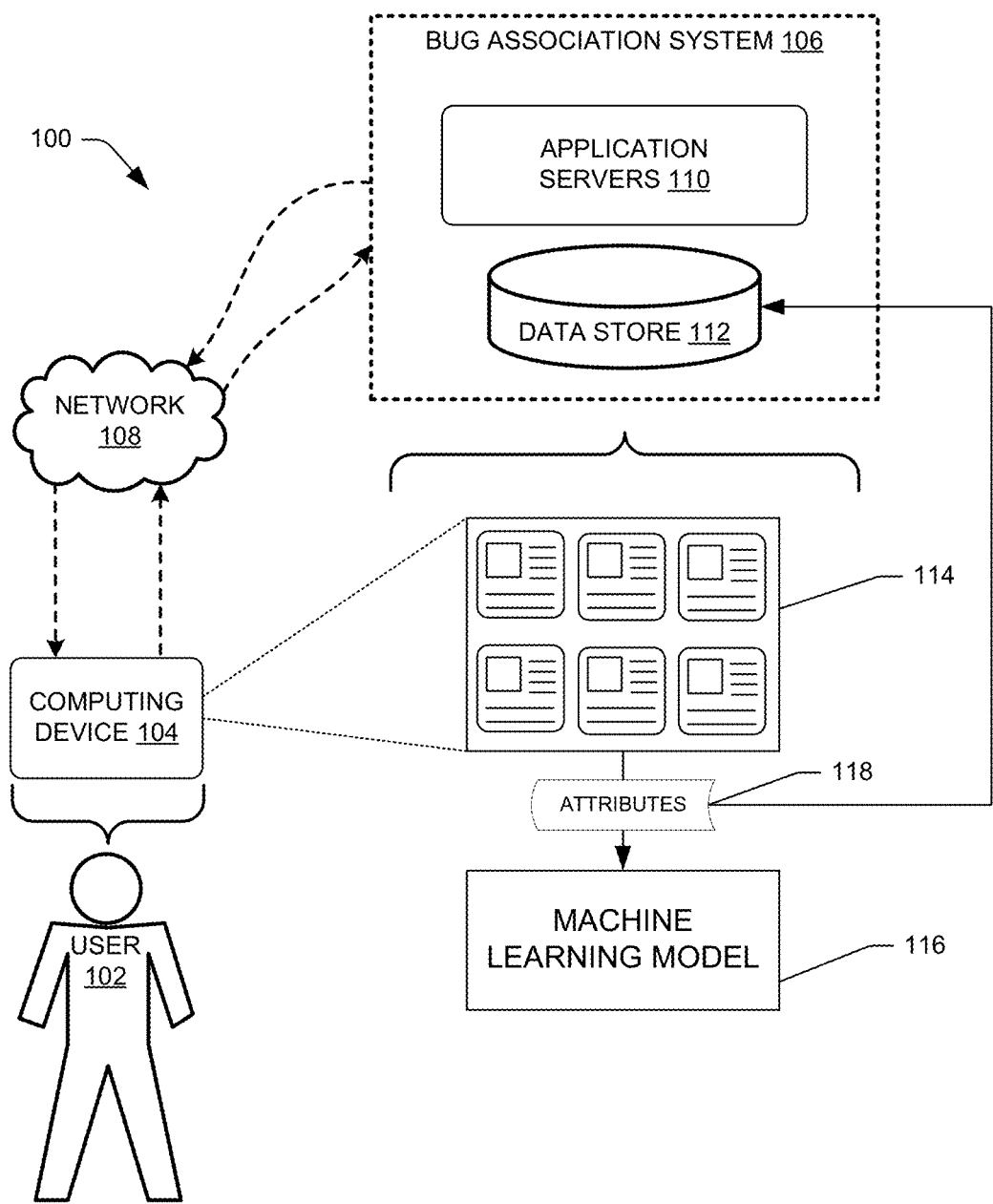
FIG. 1A is a diagram showing an example of a system for teaching a machine learning model for use with classifying bug reports, in accordance with some examples of the present disclosure.

This disclosure is generally directed to using a machine learning engine to classify, or reclassify, data gathered during the design and production process. Data related to software or hardware conflicts, parts failures, and other errors (collectively, "bugs") encountered during development can be analyzed to identify areas of development that may need additional testing or validation. This data may be reported by users in data files, or "bug reports," which may include, for example, a project name, a brief description, how a bug was detected, the fix, how severe or costly the problem or the fix was, the person who found the bug, the steps required to reproduce the bug, etc. (collectively, "bug data"). This bug reports may be provided by users via a user interface (UI), for example, provided by a manufacturer, developer, or vendor including these, and other, categories, as appropriate. Due to data entry errors, limitations in the UI, and other factors, however, the bug reports may include erroneous information or lack information that may be useful to the analysis of the design process.

The bug reports can then be analyzed and processed using machine learning techniques to identify attributes for each of the bug reports. The machine learning engine can be leveraged to classify, reclassify, and correct a large number of bug reports to enable the review and analysis of various manufacturing and development processes. The machine learning engine may also be taught to identify additional attributes not included in the initial bug reports, but discernible from the available data. In some embodiments, the bug attributes may be used to define or quantify parameters associated with each bug (and bug report). The attributes may be inputs to the machine learning model, which are used to rank associations between a selected bug report, for example, and other similar bug reports enabling searching, reporting, and analysis. In various embodiments, user input may modify influence of certain attributes during use of the model to identify trends and possible solutions.

To simplify and clarify explanation, the system is described below for use in connection with unmanned aerial vehicle (UAV) development and manufacturing. One of skill in the art will recognize, however, that the system could also be used for any type of development or manufacturing where the classification of bugs, the identification of trends, and improving work flows is desired. For simplicity, the system is described as using "machine learning," including a "machine learning model." One of skill in the art will recognize that a machine learning model is a generic term that includes a variety of models such as, for example, linear regression, logistic regression, decision tree, support vector machine (SVM), Naive Bayes, K-nearest neighbors (KNN), K-means, random forest, dimensional reduction algorithms, etc. Thus, the systems and methods described herein can be used anytime machine learning can be used to identify and rectify issues within the development and manufacturing process.

As an example, a bug association application may be used to identify and classify a particular bug report and its similarity to other bug reports. This may be particularly helpful when the bug reports are entered by different people whose reporting may include typographical errors, omissions, or simply lack certain useful information. Thus, while a bug report may be partially misclassified due to a lack of appropriate choices in the bug report (i.e., there is no category that is particularly relevant to the bug report), errors (e.g., accidentally choosing the wrong category in a drop-down menu), or other factors, the system can nonetheless be taught to properly associate the bug report with other, similar, bug reports based in part on various attributes contained in the bug report.

The machine learning model may then be used to automatically identify trends, reclassify entire datasets, or identify new attributes. The machine learning model may be used to identify bug reports which were identified at a particular stage of development, for example, as a result of having similar attribute values, where the attribute values may be associated with the person who entered the bug report, the team the person is associated with, or a particular product timeline, among other things. The system may identify a group of bug reports that were discovered at the same stage of development, for example, despite some inaccuracies (and thus, disparities) provided in the bug reports.

By using this approach, a large amount of data can be analyzed efficiently and automatically using the machine learning model, which may enable large datasets to be leveraged to identify trends, reduce or eliminate errors in the bug reports themselves, and even to identify new attributes not included in the original data. Thus, a large database of bug reports that would be unclassifiable by hand due to its size, for example, can be classified automatically using the machine learning engine. This can enable large datasets to be utilized for future development, which improves accuracy and consistency, among other things.

In some examples, a smaller subset of data, or training data, can be used to initiate the machine learning model. A user may manually identify one or more attributes for a plurality of bug reports to enable the machine learning model to be configured. The machine learning engine can then be used to automatically assign a value to that attribute in a larger dataset of bug reports. Thus, the system can be used to reclassify bug reports based on an attribute that is currently included in the bug report, but is often misused or misentered, for example, or to add an attribute that is not included in the bug reports, but is nonetheless discernable from the bug data.

As an example, the bug reports may not include a "stage of development at which the bug was found" or a "discovery method" attribute. The user may nonetheless be able to determine from looking at the bug report data at what stage of development each bug report was logged. The user may be able to identify log data from a particular flight simulator, for example, to determine that a particular bug report was logged during flight simulation. The user may also be able to identify image data from a camera that clearly depicts an outdoor flight of the UAV to determine that a particular bug report was filed during outdoor flight testing. Based on the information provided to the machine learning engine by the manual classification of a small subset of bug reports (e.g., 100 or 1000 bug reports), the machine learning engine can then add the "stage of development at which the bug was found" attribute to the remaining, possibly much larger, subset of bug reports from a bug report database.

In some embodiments, the machine learning engine may associate the bug attributes extracted from the bug data, and categorize the attributes—in some cases in contradiction to how the bug report may have been classified by the user who entered it. The attributes may then be used to identify bug reports that appear on the surface to be from different stages of development, for example, but are, in reality, similar to a particular bug report or group of bug reports. In various embodiments, the machine learning engine may automatically adjust the weights for the different attributes, and the weights may calibrate or apportion the influence of each respective attribute types on the search results. Thus, image data that is gathered automatically during the development process (e.g., as the result of a data dump when the error occurred) may be given greater weight by the machine learning engine than data entered by users, which may include data entry errors, among other things.

The machine learning engine may use training data to train the machine learning model, and thus to determine the association of attributes and/or weight of attributes, among other possible components of the machine learning model. The machine learning model may be updated over time by the machine learning engine as data correlations associated with the bug reports evolve over time. The machine learning model may be used by a bug report association application which provides various user interfaces to receive user input, which may also be used by the machine learning model. In one or more embodiments, the bug report association application may enable user input to influence weights for the attributes, which may be different weights than those provided by the machine learning engine. Thus, a user searching for problems on a particular project, a particular type of product, or a particular department (e.g., systems integration) can create reports based on their focus.

Product development generally takes place in several fairly discreet steps. An example development process for an unmanned aerial vehicle (UAV) can include, for example, initial design and brainstorming, CAD/CAM design, software coding, systems integration, simulation, tethered flight testing, cage flight testing, and finally, outdoor flight testing. As mentioned above, problems identified at the CAD/CAM design or software coding stages can often be resolved in minutes with a couple of key strokes on a computer. Problems identified during flight testing, on the other hand, can be very expensive dues to the need for parts replacement or redesign, retooling, production delays, and even prototype damage (e.g., UAV crashes caused by parts failures).

To this end, the bug report association application may automatically weigh who reports a bug, for example, or image data created during a data dump at the time the bug occurred more heavily than data entered manually by users. In this manner, though a bug may have been reported by a user as discovered during flight testing, for example, the fact that the bug was reported by a person on the systems integration team and includes data indicative of systems integration processes can be used to determine that the bug was more likely identified during systems integration, not flight testing. Thus, bug reports that contain erroneous information due to typographical errors, lack of choices, or omissions, among other things, may nonetheless be properly classified and analyzed.

The techniques and systems described herein may be implemented in a number of ways. Example implementations are provided below with reference to the following figures.

As shown in FIG. 1A, examples of the present disclosure can comprise a system for creating a machine learning model for classifying and analyzing bug reports. The example computing environment 100 shown in FIG. 1A may include a user 102 that may use a computing device 104, such as a computer, laptop, or smart phone, to access a bug association system 106, for example, across a network 108. The user 102 may be an individual or entity that desires to reclassify certain attributes found in the bug reports, for example, or to identify attributes in the bug reports that are not currently used. This can later enable the user 102 to identify trends associated with when bugs are discovered, how they are reported, and to generally improve the development process using the bug association system 106. The individual may be, for example, a manager, efficiency expert, process analyst, industrial engineer, or other individual concerned with identifying and improving manufacturing and development processes based on trends in the bug reporting process.

The computing device 104 may be a personal computer ("PC"), a desktop workstation, a laptop, a notebook, a smartphone, a tablet or slate computer, an electronic-book reader, a wearable computing device (such as a smartwatch or a virtual reality ("VR") head-mounted display), a game console, a set-top box, a consumer electronics device, a server computer, or any other computing device capable of connecting to the network 108 and communicating with the bug association system 106. The network 108 may be wired and/or wireless, such as a local-area network (LAN), a wide-area network (WAN), the Internet, or any other networking topology known in the art that connects the computing device 104 to the bug association system 106.

In some examples, the bug association system 106 can be included on the computing device 104. In other examples, some or all of the bug association system 106 can be stored and/or executed by any number of application servers 110, which may or may not be in a distributed, cloud configuration, configured to provide various services to the computing device 104 over the network 108. The user 102 may use a client application executing on the computing device 104, for example, to access and utilize the services provided by the application servers 110.

The bug association system 106 may include a database 112, which may include a plurality of bug reports, user profiles, user information, bug data, and/or other information created, or used, by the application servers 110 or computing device 104. The database 112 may include thousands of bug reports, for example, that have been collected over years of development, which would otherwise be too cumbersome to analyze manually. The bug association system 106 can enable the entire database 112 to be analyzed and classified automatically, after minimal input from the user 102. In some instances, the bug association system 106 may be configured to offer functions allowing the user 102, via the computing device 104, to search bug reports, run reports, or generate textual or graphical output (e.g., trend graphs) available from the bug association system 106.

The bug association system 106 may allow a user, via the computing device 104, to select a first subset of bug reports, or training bug reports 114, for creating the initial machine learning model 116 for use by the bug association system 106. As the name implies, the training bug reports 114 can include a subset of bug reports from the plurality of bug reports in the database 112. The user 102 may manually classify one or more attributes 118 for each bug report to train the machine learning model 116. The user 102 may manually classify 100 bug reports, for example, to enable the bug association system 106 to then classify 10,000 bug reports.

As mentioned above, in some examples, the user 102 may manually (re)classify a particular attribute that is known to have poor data integrity. A particular attribute 118 may often be misentered by users of the bug reports, for example, or may often be left blank. Thus, the user 102 can enter a value for this attribute on the training bug reports 114 to create the initial machine learning model 116.

In other examples, the user 102 may manually add an attribute to the bug reports. In other words, the bug reports may not initially contain a particular attribute 118 because the attribute 118 was not initially thought to be significant. During development, however, the significance of a particular attribute 118 may become apparent. And, though the particular attribute 118 was not initially included, the bug reports nonetheless can contain sufficient information to decipher the attribute 118 from the bug data. Identifying when (e.g., at what stage of development) a majority of bugs or the most expensive bugs were discovered, for example, can enable additional resources (e.g., testing and validation) to be directed to that stage of development or to previous stages of development, as appropriate.

As discussed below with reference to FIG. 4, the bug data may include, for example, the project name, those workers associated with the project, how the bug was found, the fix, if any, freeze frame data, the cost of the solution, the time it took to find the solution, and/or any other relevant information about a selected bug. The bug report may not initially include when (e.g., at what stage of development) the bug was found. Based on who reported the bug, how the bug was found, and/or the freeze frame data, however, the user 102 may nonetheless be able to identify when the bug was found. If the person who reported the bug is in software development and the freeze frame data is a log dump from a software simulation, then the bug was likely detected during software development. The user 102 can then add this attribute 118 to the training bug reports 114. This can enable the machine learning model 116 to include this new attribute 118.

Thus, for a particular attribute 118 (e.g., "when found"), the remaining attributes 118 may have a somewhat consistent pattern. If a bug was found during flight testing, for example, then the person who reported the bug may be the one or two people. Similarly, bug reports reported during flight testing may have other common attributes 118 such as, for example, image data that is clearly from outside, binary data dumps from a flight control system, and a common department (e.g., flight testing). As discussed below, with respect to FIG. 1B, the machine learning model 116 can then enable bug reports with similar attributes—and thus, high association scores—to be automatically labeled with the same "when found" attribute (e.g., "flight testing"). Of course, this is only an example, and the machine learning model 116 could be trained to assign other values for other attributes 118.

Figure 1B:
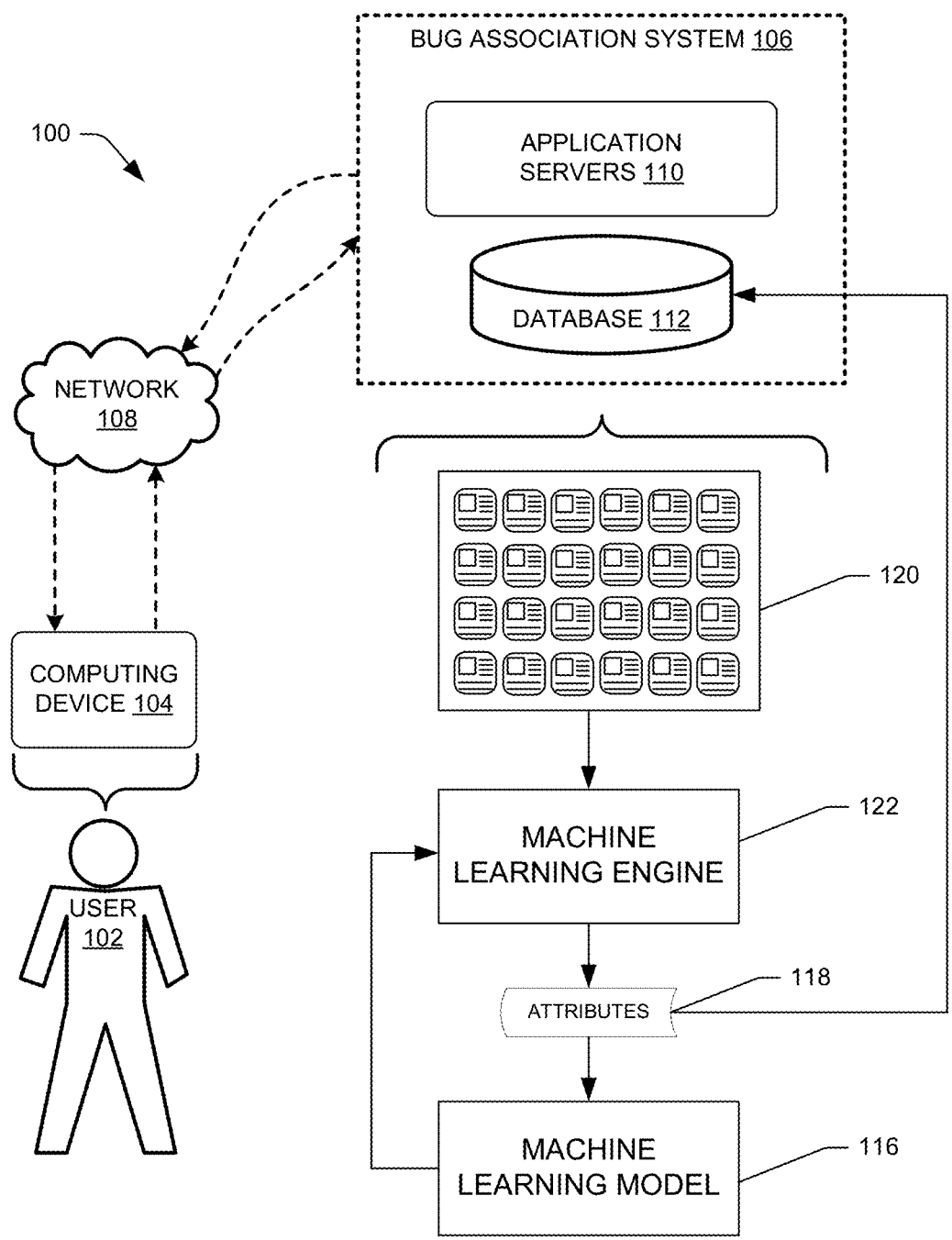
FIG. 1B is a diagram showing an example of a system that uses a machine learning engine to classify bug reports, in accordance with some examples of the present disclosure.

As shown in FIG. 1B, with the initial machine learning model 116 in place, a second subset 120 of bug reports can be analyzed to categorize the bug reports, correct attributes 118, and/or assign new attributes 118. As mentioned above, the second subset 120 may comprise a much larger dataset that would otherwise be impractical to analyze by hand. Thus, the machine learning engine 122 can be used to efficiently and automatically analyze huge sets of bug reports, for example, to identify areas of development that need additional testing, validation, or other improvements.

The machine learning engine 122 may also be able to identify areas in the bug reporting process itself that can be improved. If a particular attribute 118 is often changed from one value to another by the machine learning engine 122, this may indicate that the bug reporting application is difficult to use, provides too few options for that attribute, or is in some other way deficient. Certain attributes 118 may simply be difficult to categorize or difficult to pinpoint. In a complex system, it may not be obvious, for example, what caused a motor failure. The failure could have been caused by, for example, the motor, motor controller, transmission, rotor imbalance, etc.

As discussed below, when the machine learning engine 122 has classified the second subset 120 to add or correct an attribute, for example, the user 102 may be able to run reports, perform searches, and otherwise generate data to improve the development process. In some examples, as shown, the machine learning engine 122 can also provide the one or more attributes 118 from each bug report in the second subset 120 to the machine learning model 116. In this manner, as the process progresses, the machine learning model 116 can be refined to improve accuracy and efficiency, among other things. In other words, a machine learning model 116 based on 100,000 bug reports will likely be more accurate that the initial machine learning model 116 based on the training bug reports 114 of 100 training bugs.

Figure 2:
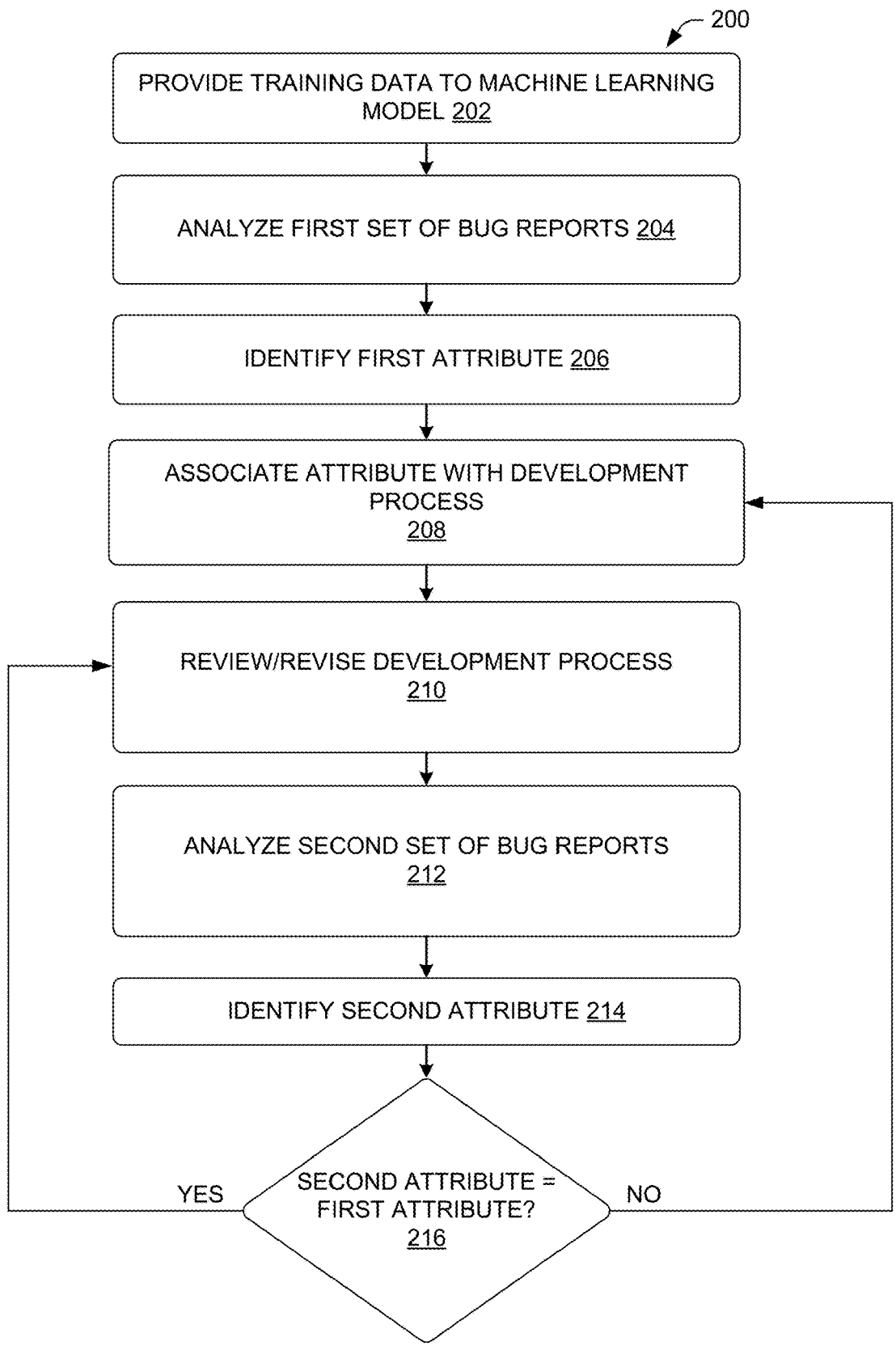
FIG. 2 is an example of a method for using machine learning classification to improve a development and manufacturing process, in accordance with some examples of the present disclosure.

As shown in FIG. 2, examples of the present disclosure can include a method 200 for using the machine learning engine 122 for analysis of product development and manufacturing. The machine learning model 116 can be trained to review bug reports related to the development process, classify and correct attributes, and even identify new attributes. This information can then be used to improve the development process.

At 202, as mentioned above, a user can supply a set of training data to establish and initial machine learning model 116. In some examples, the user may review a subset of bug reports, for example, and correct a particular attribute or identify a new attribute based on the bug data. A particular attribute may be prone to misuse or nonuse, for example. Thus, the user can go through the subset and add or correct this attribute as necessary. The user may also be able to identify a new attribute, which can be gleaned from the bug data, but is not currently an attribute used in the bug reports. In this case, the user can go through the subset and add the new attribute to train the machine learning model for this purpose. Of course, the user may add or correct multiple attributes at the same time for each bug report.

At 204, the machine learning engine 122 can use the initial machine learning model 116 analyze and classify a first set of bug reports. The first set of bug reports can be a large set of bug reports contained in the database 112 that may otherwise be too large and unwieldly to review. Analyzing a very large dataset can improve the accuracy and consistency of the data and enable the identification of trends and the significance of various attributes. As mentioned above, the analysis can include the correction of various attributes in the bug reports and/or the addition of new attributes.

At 206, the machine learning engine 122 can be used to identify a first attribute. The first attribute can be a single attribute, or a plurality of attributes, that have some statistical significance. So, for example, the machine learning engine 122 can determine that a higher number or bug reports include data (e.g., image data or log files) from a particular flight simulation software. Or, the machine learning engine 122 may determine that one person has filed more bug reports than any other person.

At 208, the machine learning engine 122 can associate the first attribute to a stage of development. In other words, if the first attribute is associated with flight simulation, then the machine learning engine 122 can associate the first attribute with flight simulations. If, on the other hand, the person who reports the highest number of bug reports is on the systems integration team, the machine learning engine 122 can associate the first attribute with systems integration.

In some examples, though a first attribute is statistically significant, the machine learning engine 122 may be unable to associate the first attribute with a particular stage of development. In this case, the machine learning engine 122 may be programmed to solicit input from a user, generate a report for analysis, or send an error report to this effect. Thus, while the machine learning engine 122 may be unable to associate the first attribute automatically, it can nonetheless provide the data to enable a user to do so.

At 210, based on the information provided by the machine learning engine 122, improvements to the identified stage of development can be implemented. If flight simulation is associated with the first attribute, for example, then updates to the flight simulation software may be implemented. Similarly, if systems integration is associated with the first attribute, then additional validation and testing may be implemented at the systems integration stage or, more likely, at previous stages—e.g., bugs reported at the systems integration stage may be caused at earlier stages of development.

At 212, the machine learning engine 122 can be used to analyze a second set of bug reports. In some examples, the second set of bug reports can be collected after the improvements discussed above are implemented. Thus, in some examples, the second set of bug reports can include a date component, for example, to separate the first set of bug reports from the second set of bug reports. In other examples, the second set of bug reports can include the first set of bug reports and subsequent bug reports. In this configuration, the machine learning engine 122 can analyze all bug reports to determine if the improvements cause a trend in the desired direction.

At 214, the machine learning engine 122 can identify a second attribute. As before, the second attribute can be a single attribute, or a plurality of attributes, that have some statistical significance. So, for example, the machine learning engine 122 can determine that a higher number or bug reports include data (e.g., image data or log files) from a particular software simulation. Or, the machine learning engine 122 may determine that a significant number of bug reports include "update software" as the solution for the bug.

At 216, the machine learning engine 122 can determine if the second attribute is the same as the first attribute. If so, this may indicate that the improvements to the identified stage of development did not have the desired effect, for example, or that other problems at that stage of development exist. Thus, the method 200 can return to 210 to review and revise the development process.

At 216, if the second attribute is different than the first attribute, on the other hand, the method 200 can return to 208 to associate the second attribute with a particular stage of development. Thus, in the example above, if the second attribute is associated with a particular software simulator, the machine learning engine 122 can associate the second attribute with software development. Similarly, if the second attribute is associated with the aforementioned "update software," the machine learning engine 122 can again associate the second attribute with software development. Based on this information, modifications can be made to the software development portion of development in an attempt to improve efficiency and reduce bugs at that stage.

Figure 3A:
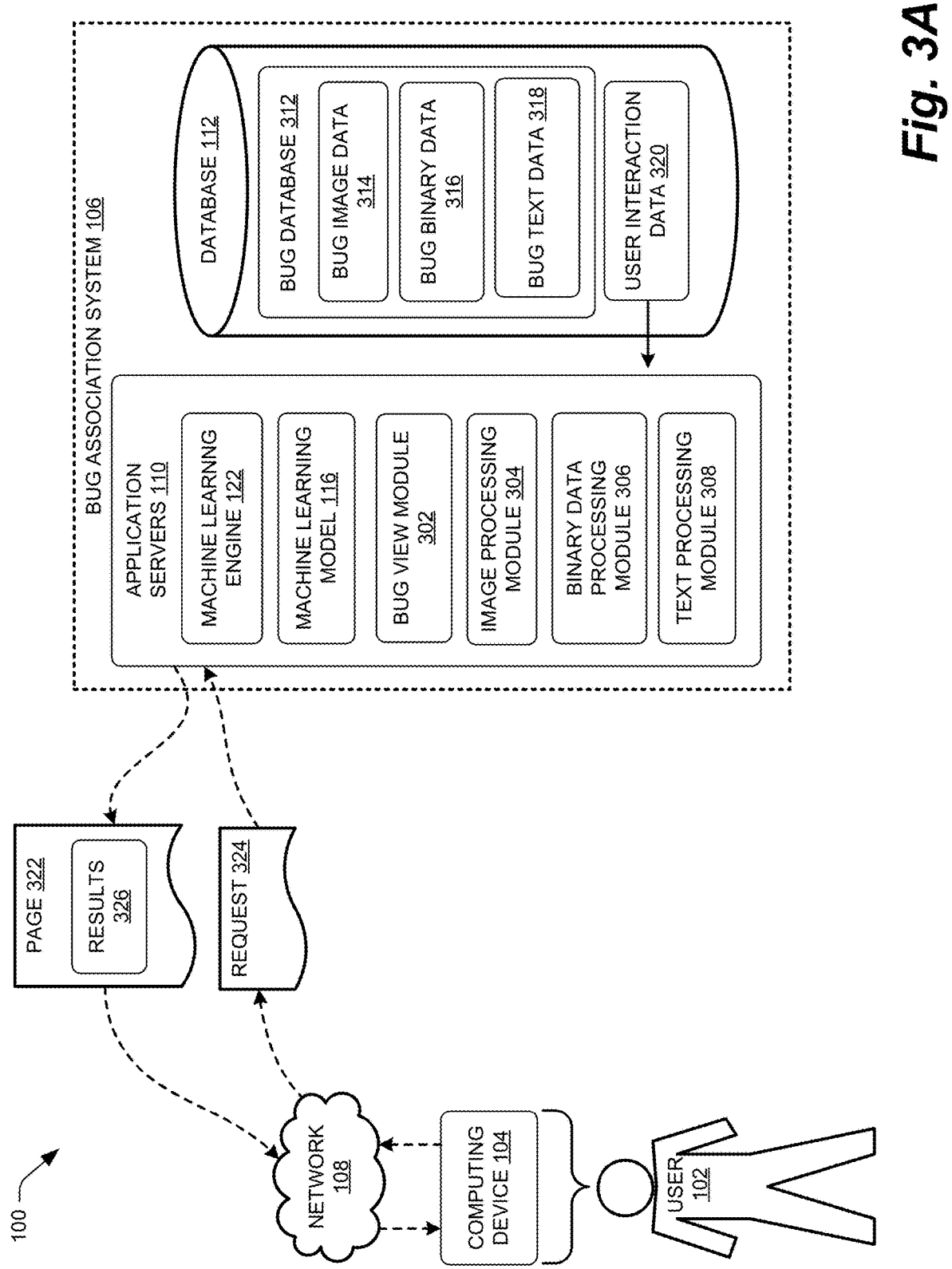
FIG. 3A is an example of a bug association system, in accordance with some examples of the present disclosure.

FIG. 3A is schematic diagram of a more detailed version of the illustrative computing environment 100 including the aforementioned bug association system 106, which can include one or more application servers 110 and the database 112. The application servers 110 may be configured to execute a number of modules in order to provide the services, such as data storage, analysis, and searching, to the computing device 104. The modules may be configured to execute on a single application server 110 or in parallel across multiple application servers in the bug association system 106. In addition, each module may include a number of subcomponents executing on different application servers 110 or other computing devices in the bug association system 106. The modules may be implemented as software, hardware, or any combination of the two.

The application servers 110 can contain the machine learning model 116 and the machine learning engine 122. In some examples, the application servers 110 can also comprise a bug view module 302 may be configured to execute on the application servers 110. The bug view module 302 may be configured to retrieve information regarding a particular bug, generate bug details containing the bug information, provide search functions, and transmit the bug details over the network 108 to the client application for presentation to the user 102 via the computing device 104. The Applicant servers can also include an image processing module 304, a binary data processing module 306, and a text processing module 308.

The database 112 can include a bug report database 312, which can include a plurality of bug reports (e.g., the training bug reports 114, second subset 120, etc.) and may be stored as, for example, a cloud storage device, hard drive(s), solid state drive (SSD), or other storage mechanism available to the application servers 110.

The bug report database 312 may contain bug image data 314, bug binary data 316, and bug text data 318, among other things. The bug image data 314 may include graphical images relevant to the bug reports such as, for example, screenshots from software ruining at the time of the bug, images from one or more cameras (e.g., external cameras on a UAV or in a test environment), or other image data. The bug image data 314 may be stored using the JPEG, PNG, or GIF image formats. Other image formats may also be utilized to store the bug image data 314. The bug image data 314 may be analyzed by the machine learning engine 122, for example, to extract additional attributes about each bug, such as the relevant software running (e.g., simulation software vs. flight control software), test conditions (e.g., sunny vs cloudy, obstructions, etc.), and other attributes. As mentioned above, the machine learning engine 122 may be able to identify a program from the image data, for example, based on the format of the screenshot or the data provided therein and then associate the bug report with a particular attribute (e.g., a particular stage of development).

The bug report database 312 may also contain bug binary data 316. As the name implies, bug binary data 316 can comprise binary data from program log files, memory dumps, and other data produced proximate the time the bug occurred. When an error is detected, various software and hardware components can be programmed to provide a memory dump, for example, that provides data related to various conditions at the time the bug occurred. So, for example, a motor controller that detects a motor malfunction and shuts down the offending motor may dump data related to the temperature, amp draw, and RPM of the motor at the time of shutdown, or other log files in the form of bug binary data 316.

The bug text data 318 may include metadata and/or textual data for each bug provided in the bug reports. The bug text data 318 may include, but is not limited to, information about a bug, such as the name of the person reporting the bug, their department, the type of bug, the stage of development during which the bug was discovered, etc. Bug text data 318 can also include software code, error reports, error message or codes, system parameters (e.g., motor RPM, altitude, battery charge level, ambient temperature, etc.), or other information gathered at the time the bug occurred. In some examples, the machine learning engine 122 may extract bug text data 318 from bug image data 314 (e.g., extracting bug text data 318 from a screenshot of a UAV virtual dashboard).

In some examples, the image processing module 304 may be used by the machine learning engine 122 to analyze bug image data 314 obtained from the bug database 204 to identify attributes of the bug associated with the bug image data 314, such as, for example, the bug type (e.g., bug reports located during simulation), the person or department reporting the bug, the solution, or the cost to fix the bug.

The image processing module 304 may use image analysis techniques known to those skilled in the art to identify the attributes, such as, for example, feature extraction techniques to identify lines, edges, ridges, textures, and shapes in the image data. In some examples, the images may be pre-processed to, for example, re-sample them, reduce noise in the data, enhance the contrast in the images, or to perform text recognition (e.g., for screenshots of data or code). In some examples, the image processing module 304 may use one or more of the following techniques to analyze the images: point of interest selection, segmentation, image recognition, and image registration.

As the name implies, the binary data processing module 306 can process and analyze the binary data 207 for further analysis. In some examples, the binary data 207 can include data that can be converted to text data 206. In other examples, the binary data 207 can be converted from a binary form (e.g., a .JPG file) to other forms for use as image data 208. This may include a memory dump from a camera on the UAV, for example, that includes a camera view at the time the bug occurred.

In some examples, the text processing module 218 may be configured to receive bug text data 318 from the bug database 204, such as metadata and textual bug descriptions, and identify attributes of the bug associated with the bug text data 318. In some examples, the text processing module 218 may use known text analysis techniques to identify the bug attributes, such as, for example, natural language processing (NLP).

In various embodiments, the machine learning engine 122 may process the bug data associated with a large number of different bug reports from different bug categories and can be used to create the machine learning model 116, which may be deployed as described above to determine associations between bug reports, some that may otherwise not be identifiable. In some embodiments, the machine learning engine 122 may associate the bug attributes extracted from the bug data, and categorize the attributes. The attributes may then be used to identify bug reports from a different bug category that have attributes similar to the attributes of the first bug. In various embodiments, the machine learning engine 122 may determine weights for the parameter types, and the weights may calibrate or apportion the influence of the respective attribute types on the search results. The machine learning engine 122 may use training data to train the machine learning model 116, and thus to determine the association of attributes and/or weight of attributes, among other possible components of the machine learning model 116. Training data may also be provided by users in developing the machine learning model 116, with a subset of bug reports being manually categorized by users, for example, to provide a starting point for the machine learning engine 122.

The machine learning engine 122 may employ one or more algorithms, such as supervised learning algorithms (e.g., artificial neural networks, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, training data used for training the machine learning engine 122 may include data associated with a plurality of previous user interactions, and/or other user feedback or interaction with the machine learning model 116 or output from the machine learning model 116.

The machine learning model 116 may be deployed to analyze the bug data associated with a large database of bug reports from bug categories that are different than the first bug category, and identify bug reports from the different bug categories that have attributes similar to the attributes of the first bug. The machine learning model 116 may be updated over time by the machine learning engine 122 as data correlations associated with the bug reports evolve over time.

In some examples, the database 112 can also include user interaction data 320. In other words, users may provide input to instruct the machine learning engine 122 to place greater emphasis on a particular attribute, or to change the weight of an attribute in the machine learning model 116. A user interested in controlling development costs may place emphasis on the cost to resolve a bug, for example, while a user interested in solving a particular problem may focus a specific attribute related to that specific problem (e.g., "bugs caused by hardware failures").

The bug details transmitted by the application servers 110 to the computing device 104 may be contained in network pages 322, which may include hypertext markup language ("HTML"), extensible markup language ("XML"), and/or JAVASCRIPT object notation ("JSON") that contains some or all of the bug text data 318, bug binary data 316, and bug image data 314 for the represented bug reports, along with instructions regarding how the information is to be displayed on the computing device 104. Any number of methods and technologies may be used that allow the bug view module 302 to encode the bug information in the bug details and send the bug details to the computing device 104 for display to the user 102. Other information transmitted from the bug view module 302 to the computing device 104 may be similarly formatted.

In some examples, the bug view module 302 may be configured to offer a search function allowing a user 102 to search bug reports available from the bug association system 106 by typing a search query into a search network page. For example, when the user 102 inputs the search query, a request 324 may be transmitted to the bug view module 302. In response, the bug view module 302 may perform a search of the bug report database 312 to identify bug reports associated with the search query. The bug view module 302 may thereafter return a page 324 to the computing device 104 that includes results 326 of the supplied query. In turn, the client application executing on the computing device 104 may render the page 324 for viewing by the user 102.

The user 102 may also select one of the bug reports represented in the results 326 in order to obtain additional information regarding the selected bug. In response to such a selection, the bug view module 302 may provide a network page that includes bug details for the selected bug. The bug details may include, but are not limited to, some or all of the, the bug image data 314, bug binary data 316, bug text data 318, and/or other information about a selected bug. In some examples, the page 324 may also provide functionality for allowing the user 102 to use the bug as a basis for additional searches, for example, or to focus on a particular attribute of the bug.

In some embodiments, the machine learning engine 122 may analyze the bug image data 314, the bug binary data 316, and the bug text data 318 to extract one or more attributes 118 and to categorize and/or organize the bug reports in one or more ways. The attributes 118 from the training data (e.g., the training bug reports 114) can be used to create correlations between the bug image data 314, the bug binary data 316, and the bug text data 318 and the attributes 118. Based on this analysis, the machine learning engine 122 may create the machine learning model 116, which may use the attributes to calculate an association score between various bug reports based on the correlations. The machine learning model 116 may include weights for different attributes, which may be used and updated by the machine learning engine 122. In some examples, the machine learning model 116 may include user weights for individual attributes 118 that apportion the influence of the attributes 118 in calculation of the association score, thus allowing users to influence an output of the machine learning engine 122 via user input received by user interfaces.

Thus, the machine learning engine 122 may extract the bug image data 314 from a first bug report, analyze the bug image data 314 with the image processing module, and then look for correlations between the bug image data 314 in the first bug report and the bug image data 314 in the training bug reports 114 of training bug reports. The machine learning engine 122 may determine that the bug image data 314 in the first big report includes a screenshot of a log from a flight controller and an image from a camera of a UAV, both of which tend to correlate to an outdoor flight test. In this case, the machine learning engine 122 may determine that there is a high correlation between the bug image data 314 in the first bug report and the bug image data 314 found in the training bug reports 114 for training bug reports labeled "outdoor flight testing." As a result, the machine learning engine 122 may automatically label the first bug report as being associated with outdoor flight testing.

In some examples, the machine learning engine 122 may be configured to update the weights in the machine learning model 116 based at least in part on repeated calculations of the association score to improve the accuracy of the machine learning model 116. For example, user interaction data 320 may be used by the machine learning engine 122 to further refine the machine learning model 116 over time as users provide feedback (e.g., via interaction with a GUI, etc.) to the machine learning engine 122.

In some examples, the machine learning engine 122 may create or modify the machine learning model 116 at different times. For example, the user interaction data 320 may be analyzed by the machine learning engine 122 to determine indicators (e.g., attributes) that result in strong correlations between the bug image data 314 and the bug text data 318 and bug reports that have similar or matching attributes. The machine learning engine 122 may select weights to apportion the effect of each attribute individually. The machine learning engine 122 may update the machine learning model 116 using the indicators and weights, which work as a function to create an association score that indicates the similarity between various bug reports. In some examples, the machine learning model 116 may also be implemented without the use of weights.

In some examples, the machine learning model 116 may use the data associated with each of the bug reports to determine an association score that indicates the likelihood of a second bug having attributes that match, or are similar to, the attributes of the first bug. Based on a selected first bug report from a first bug category (e.g., "systems integration"), for example, the machine learning model 116 may receive the first bug image data 314 and the first bug text data 318 associated with the first bug report, for example, from the bug database 204. In some examples, the first bug report may have been previously identified as a result of a search query by the user 102, for example, as explained herein.

The machine learning engine 122 can analyze the first bug image data 314 and the first bug text data 318 to identify first attributes of the first bug report. The machine learning model 116 may thereafter assign a new attribute to the first bug report or change an attribute based on the first attributes. The first attributes may include, for example, a project name, a brief description, how a bug was detected, the fix, how severe or costly the problem or the fix was, the person who found the bug, etc. The first bug report may have originally been entered as a bug that occurred during "systems integration," for example, but, based on the first attributes, is recategorized by the machine learning engine 122 as a bug that occurred during "cage flight testing."

In addition, the machine learning engine 122 may thereafter identify a plurality of bug reports different than the first bug report, including bug reports from a different bug category, wherein the plurality of bug reports nonetheless having attributes similar to the attributes of the first bug. Based on this information, the machine learning engine 122 may recategorized the plurality of bug reports as well.

In some examples, identifying the second bug may include calculating, using the machine learning engine 122, an association score between the plurality of bug reports and the first big report. Based at least in part on the association score, similarities between the attributes associated with the first bug report and the attributes associated with each of the plurality of bug reports may be determined. Identifying the plurality of bug reports may also include identifying the bug reports having attributes similar to the attributes of the first bug report from the plurality of bug reports s for which the association score is (1) above a threshold association score and/or (2) is in a predetermined percentile of association scores (e.g., top 5%, 10%, 25%, etc.).

In some examples, a plurality of association scores may be calculated for each of the plurality of bug reports analyzed, and the plurality of bug reports associated with respective association scores that are above a threshold association score may be identified as having similar attributes. In some examples, the threshold association score may be selected or designated by the user 102, for example, via a user interface. In some examples, the threshold association score may be determined by the machine learning engine 122 based on, for example, algorithms, statistical models, percentages, or other methods. In some examples, the association scores may be ranked in descending order, and the plurality of bug reports having association scores that rank highest may be identified as having similar attributes. In some examples, the user 102 may select or designate the number of ranked scores for which second bug reports are identified, for example, via a user interface. In some examples, the association score may be derived from, or correlate to, a loss function, which may, for example, be inversely related to the association score.

In some examples, the machine learning engine 122 may also be configured to calculate a confidence score associated with each of the plurality of bug reports identified as having an association score above the threshold association score and/or an association score among the highest ranked association scores. The confidence score may be associated with a probability that the association score is accurate. For example, machine learning engine 122 may determine that one of the attributes of the first bug report, which may be, for example, a flight test bug, is that the first bug report was entered by a particular person. However, if that person is on another team (e.g., systems integration), the correlation between these two attributes may be low. In such cases, the confidence score may be low. In such situations, a person may manually determine whether the bug was, in fact, discovered during flight testing or, instead, was misentered in the system. In some examples, the person may update the bug report database 312 to reflect the correct information.

Figure 3B:
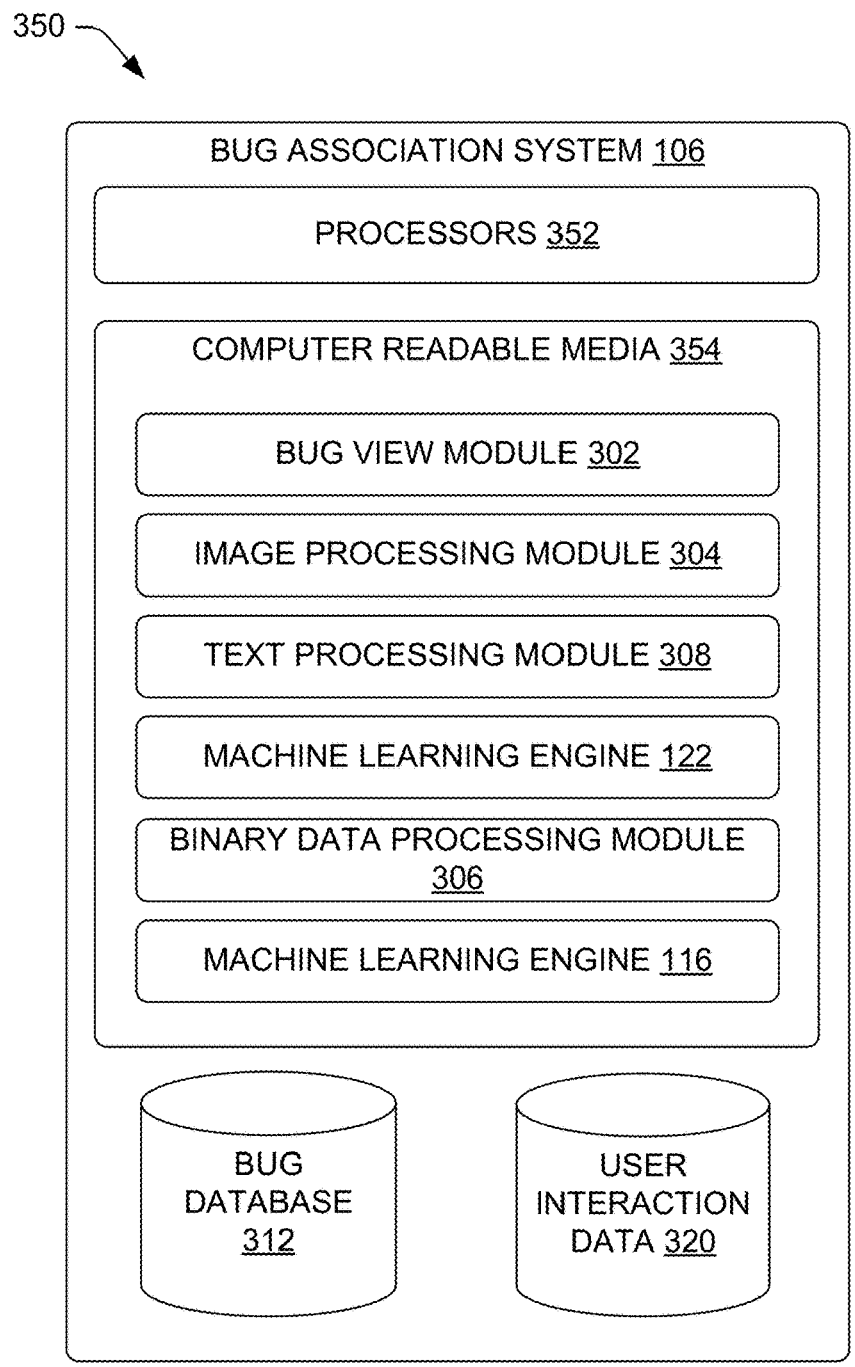
FIG. 3B is an example of a computing architecture for running the bug association system of FIG. 3A, in accordance with some examples of the present disclosure.

FIG. 3B is a block diagram of an illustrative computing architecture 350 to perform searches for bug reports having similar attributes using machine learning. The computing architecture 350 may be implemented in a distributed or non-distributed computing environment. The computing architecture 350 may include one or more processors 352 and one or more computer-readable media 354 that stores various modules, applications, programs, or other data. The computer-readable media 354 may include instructions that, when executed by the one or more processors 352, cause the processors to perform the operations described herein for the bug association system 106.

Embodiments may be provided as a computer program including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read only memory (CD-ROM), digital versatile discs (DVDs), ROM, random access memories (RAM), electronically erasable and programmable ROM (EEPROM), flash memory, magnetic or optical cards, solid-state memory devices, or other types of media/machine-readable medium suitable for storing electronic instructions. Further, embodiments may also be provided as a computer program including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 354 may store the machine learning model 116, the machine learning engine 122, the bug view module 302, the image processing module 304, the binary data processing module 306, and the text processing module 308, which are described above. The components may be stored together or in a distributed arrangement. The various components 116,

122, 302, 304, 306, 308 may also store or have access to the bug report database 312 and the user interaction data 320, among other things, which may be stored locally and/or remotely.

Figure 4:
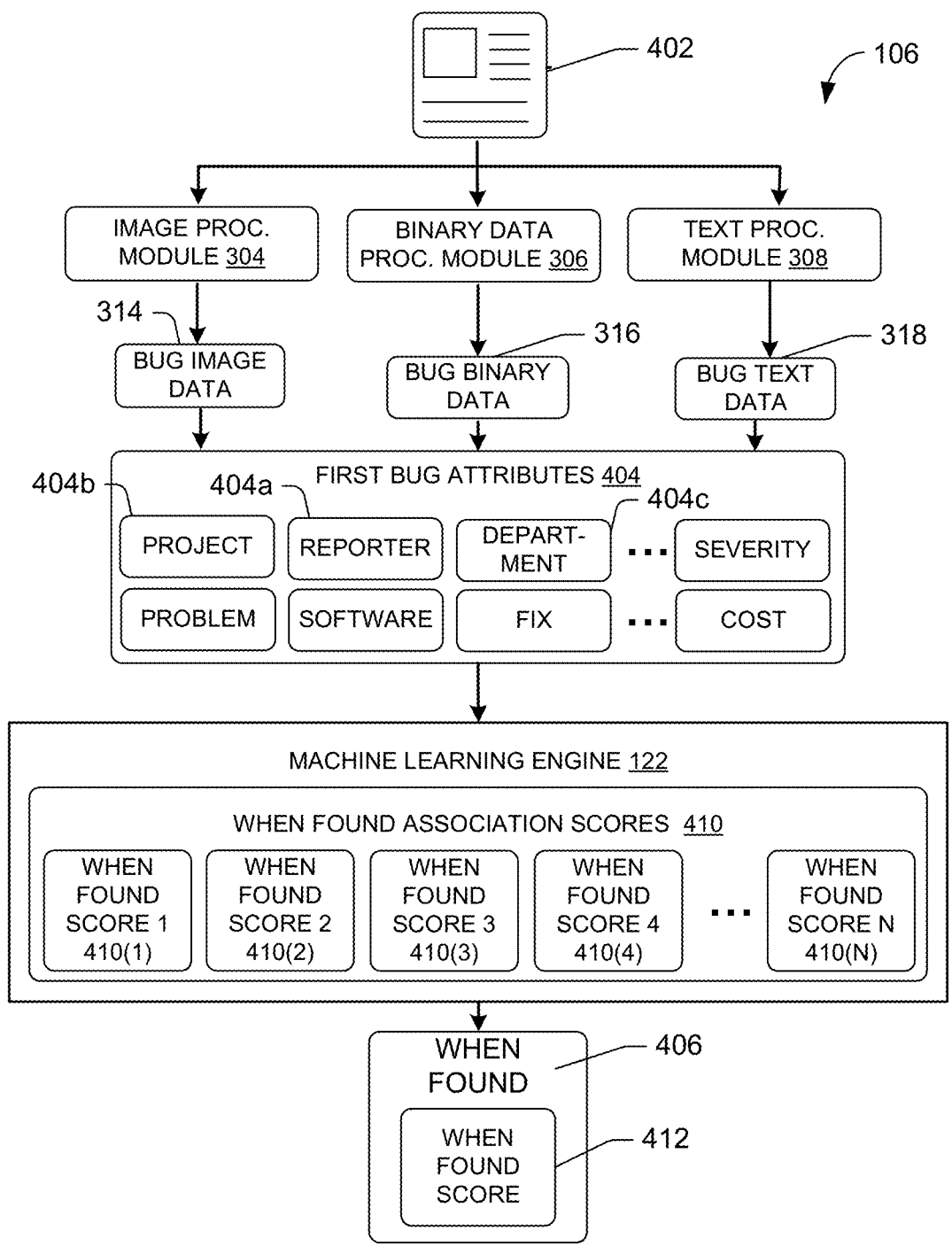
FIG. 4 is a schematic diagram of the bug association system assigning an additional attribute to a first big report, in accordance with some examples of the present disclosure.

FIG. 4 is a block diagram of an example bug association system 106 being used to automatically add a new attribute—or correct an old attribute—to an existing bug report. As shown, the bug association system 106 can first analyze a first bug report 402 to extract a plurality of preexisting first bug attributes 404. The bug association system 106 can then use the machine learning engine 122 to analyze the first bug attributes 404 and assign an additional attribute 406. Of course, the bug association system 106 could instead be used to correct an existing first bug attribute 404 that was, for example, incorrectly entered, ambiguous, or otherwise lacking.

In this example, the first bug report 402 can be a flight test bug report retrieved from, for example, the bug report database 312. In other words, the bug was found during flight testing, but the first bug attributes 404 do not initially include this category (e.g., "when found"=flight testing). Using the first bug report 402, the example bug association system 106 can extract bug image data 314, bug binary data 316, and bug text data 318 associated with the first bug report 402. The image processing module 304, binary data processing module 306, and the text processing module 308 may be configured to extract the first bug attributes 404 from the first bug report 402 using the bug image data 314, bug binary data 316, and the bug text data 318, respectively, for example, using the techniques described above. In some examples, some or all of these steps may be performed, or assisted, by the machine learning engine 122.

The example bug association system 106 may be able to extract attributes 118 that are specifically enumerated in the first bug report 402 and those that are implied. The bug text data 318 may include, for example, an entry including the reporter 404a of the bug (i.e., the person who entered the first bug report 402), the name of the project 404b, and other first bug attributes 404 in one or more text fields in the first bug report 402. The bug image data 314, on the other hand, may be determined by the image processing module 304 to be an outdoor image (e.g., it contains sunlight, buildings, etc.). Thus, while not specifically include in the first bug report 402, the example bug association system 106 may nonetheless be able to determine that the department 404c that reported the bug is "outdoor flight testing"-possibly because this is the only department that performs tests outdoors. The binary data processing module 306 may determine that the problem 404c was due to a motor failure from a binary data dump of the motor controller. The machine learning engine 122 may also assign values to the remaining first bug attributes 404 such as, for example, a brief description, how a bug was detected, the fix, how severe or costly the problem or the fix was, etc. Other attributes are contemplated.

Based on information gleaned during the creation of the machine learning model 116, the machine learning engine 122 can then attempt to assign one or more additional attributes 406 (e.g., "when found") to the first bug report 402. As shown in FIG. 4, therefore, the machine learning engine 122 can calculate a "when found" association score 410 for each possible value in the "when found" category. The machine learning model 116 may include N values for "when found," for example, each related to when during development a bug was found. The machine learning engine 122 can then calculate an association score 410 for each when found value with respect to the first bug report 402.

The machine learning engine 122 can then assign a value for the additional attribute 406 ("when found") and/or provide a when found score 412.

In this example, the machine learning model 116 can include N when found values (e.g., initial development, software design, hardware design, systems integration, simulation, indoor flight testing, outdoor flight testing, etc.). To calculate the when found score 410 for each when found value, the machine learning model 116 can evaluate commonalities between the first bug report 402 and the attributes 118 associated with each of the possible values for when found.

In this example, assume that when found score 410(1) is associated with the when found value "initial design," when found score 410(2) is associated with the when found value "systems integration," when found score 410(3) is associated with the when found value "flight simulation," when found score 410(4) is associated with the when found value "indoor flight testing," and when found score 410(N) is associated with the when found value "outdoor flight testing." Thus, when training the initial machine learning model 116 discussed in FIG. 1, for a first value of when found—e.g., "flight testing"—the majority of training bug reports 114 may have a particular pattern for the value for the name of the reporter 404a, the project 404b, and other attributes 118. For a second value of when found—e.g., "systems integration"—on the other hand, the majority of training bug reports 114 may have a different pattern for the value for these attributes 118, and so on.

Thus, assuming the first bug report 402 is from "flight testing", then the when found associations scores 410 for the other categories will be low because the attributes 118 associated with the respective when found values will be low. In this example, therefore, when found score 410(1)-when found score 410(4) may be low (e.g., between 0-10%) because the first bug report 402 has no, or only a few, common attributes 118 with these values. The when found score 410(N), on the other hand, may have a noticeably higher score (e.g., 70-95%) because the first bug report 402 was generated during flight testing and thus, has several, or all, attributes 118 in common with this value.

As mentioned above, in some examples, the output of the machine learning engine 122 can be the additional attribute 406 (e.g., when found="outdoor flight testing") and the when found score 410(N). The when found score 410 may enable a user to determine a correlation and/or confidence in the additional attribute 406, for example. In some examples, the example bug association system 106 may automatically assign the additional attribute 406 to the first bug report 402 if the when found score 410 is above a first threshold (e.g., greater than 80% or 90%). If the when found score 410 is below the first threshold, on the other hand, the bug association system 106 may place the first bug report 402 in a queue for additional review by a worker, for example, or to be reviewed again by the bug association system 106 at a later date (e.g., the machine learning model 116 is constantly improving and updating).

Figure 5A:
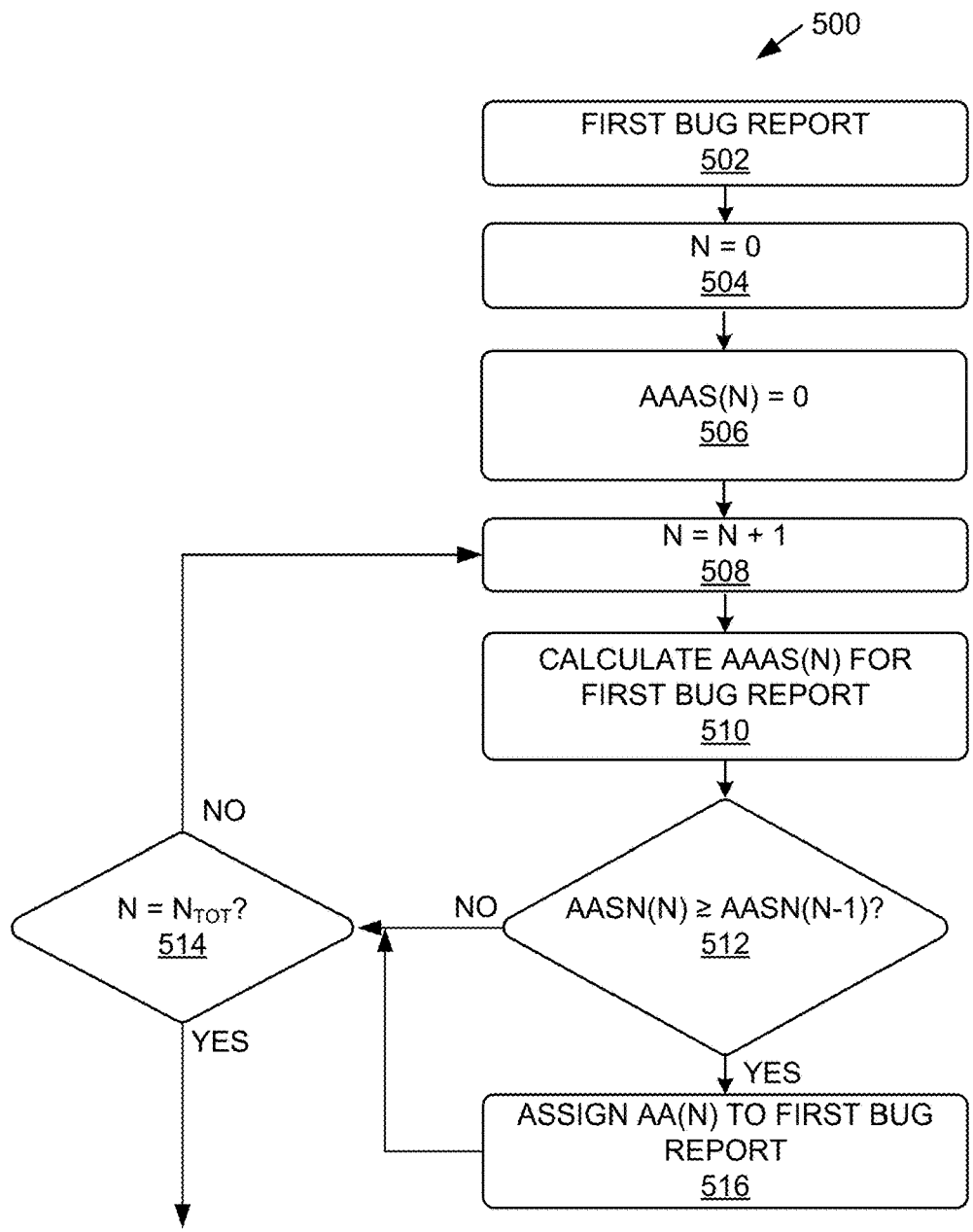
FIG. 5A is an example of a method for identifying a plurality of second bug reports with a threshold similarity score to a first bug report, in accordance with some examples of the present disclosure.
Figure 5B:
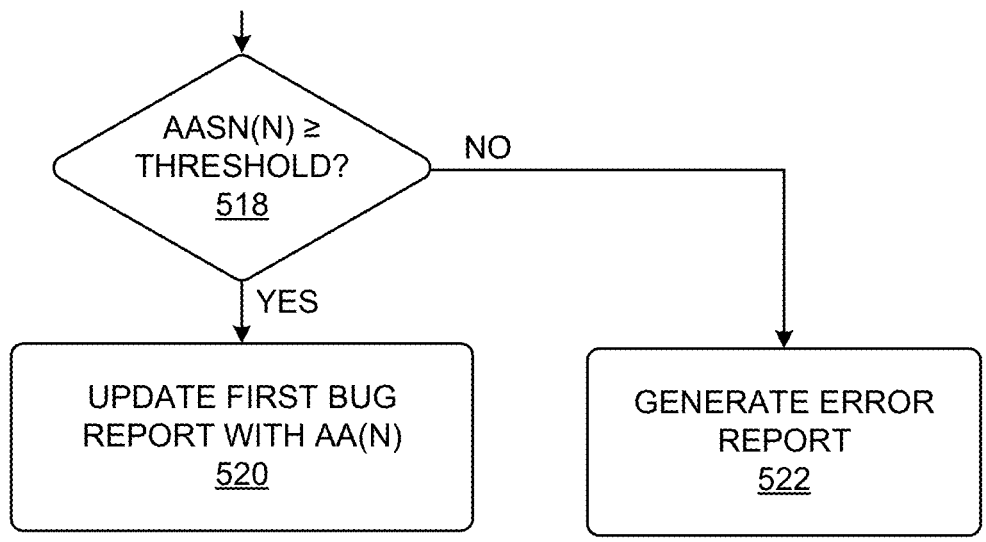
FIG. 5B is an example of a method of assigning an additional attribute to a first big report based on a plurality of selected second bug reports, in accordance with some examples of the present disclosure.

As shown in FIGS. 5A and 5B, examples of the present disclosure can more generally comprise a method 500 for automatically assigning, or correcting, a value for an attribute 118 of a first bug report. In other words, while discussed above with reference to adding the "when found" attribute to bug reports, the systems and methods described herein could be used to add, or correct, any attribute 118 that can be taught to the machine learning engine 122 and gleaned from the available data. In some examples, assigning an additional attribute 406, or correcting an existing attribute 118, can be a multi-step process. In other words, in some examples, the machine learning engine 122 can first calculate an additional attribute association score (AAAS) for each value of a particular attribute 118 with respect to the first bug report 402, select the value with the highest AAAS, and then determine whether the selected AAAS is above a predetermined threshold (e.g. 90%). The machine learning engine 122 can then determine whether to automatically assign the additional attribute 406 to the first bug report 402, or generate an error report.

At 502, the method 500 can begin by receiving the first bug report 402. This can be by retrieving the first bug report 402 from the bug report database 312, for example, or another source. As mentioned above, the first bug report 402 can be a bug report that does not include a particular attribute 118—e.g., the attribute 118 was not included in the bug reporting software—or includes an attribute 118 that was often misused, left blank, ambiguous, or otherwise deficient.

Regardless, at 504, the method 500 can begin by setting a counter (e.g., "N") to zero. As discussed below, the counter can be used to cycle the method 500 through all of the values for a particular additional attribute 406 to calculate the AAAS for each (e.g., AAAS(1), AAAS(2), etc.). At 506, the method 500 can also initially set AAAS(0)=0. In other words, at the outset, no AAAS has been calculated, but, as discussed below, a value is nonetheless used for comparison.

At 508, the method 500 can increase the counter by 1 to begin the review process for the first value of the additional attribute 406—i.e., calculating AAAS(1). So, for example, if the additional attribute 406 being added to the first bug report is the type of software that was running at the time the bug was reported, then the various values for the additional attribute (AA) could be, for example, AA(1)—"no software," AA(2)—"software simulation," AA(3)—"systems integration software," AA(4)—"flight simulation software," and AA(5)—"flight control software."

At 510, the method 500 can calculate AAAS(1) for the first value of the additional attribute 406 when compared to the first bug report 402. As mentioned above, AAAS(1) can be calculated based on the similarity between one or more attributes 118, combinations of attributes 118, or other patterns that have been created in the machine learning model 116 and can be identified by the machine learning engine 122. Thus, in this case, the machine learning engine 122 can calculate the AAAS between the attributes 118 of the first bug report 402 and the aggregated attributes 118 of bugs discovered that involved "no software" (AAAS(1)), where the additional attribute 402 (AA(1)) is related to the type of software running when the first bug occurred.

Thus, if the bug associated with the first bug report 402 was discovered when "no software" was running (e.g., during initial design), then AAAS(1) will be high. In other words, the association score between the first bug report 402 and other bug reports discovered when "no software" was running will be high—though this is not a direct comparison as such, but rather is included in the machine learning model 116. If the first bug report 402 relates to a bug discovered during "flight testing" (when flight control software would likely be running), on the other hand, the AAAS(1) would likely be low.

At 512, the method 500 (e.g., the machine learning engine 122) can determine whether AAAS(1) is the highest AAAS yet calculated. In the first iteration, since AAAS(0) is initially set to zero, then any AAAS (e.g., AAAS(1)) will be equal to or greater than AAAS(0)). As the method 500 progresses, however, this step can ensure that the highest AAAS is retained and others are discarded. If the first bug report 402 is associated with a bug discovered during flight simulation, for example, then AAAS(4) will likely be the highest AAAS among the various values AA(1)-AA(5) for the additional attribute 406.

At 514, if AAAS(N)≤AAAS(N−1)—in this case if AAAS (1)≤AAAS(0)—then the method 500 can determine if all AASNs have been calculated (i.e., N=N$_{TOT}$) for all values of the additional attribute 406 (e.g., AA(1)-AA(N)). If not, at 508, the counter (N) can again be incremented by one to calculate the AAAS for the next value of the additional attribute 406—in this case AAAS(2) for AA(2), or "software simulation software". This iterative process can continue until an AAAS has been calculated for all possible values of the additional attribute 406 (AA(1)-AA(N)).

At 516, if AA(N)≥AA(N−1), on the other hand, then the machine learning engine 122 can temporarily assign this value—e.g., AA(1)—to the additional attribute 406 for the first bug report 402. In this case (i.e., the first iteration, or N=1), AAAS(1)≥AAAS(0)—AAAS(1) cannot be less than zero. As a result, AA(1) ("software simulation software") is initially, and possibly temporarily, assigned to be the value for the additional attribute 406 for the first bug report 402.

At 514, the method 500 can again determine if all AASNs have been calculated (i.e., N=N$_{TOT}$) for all values of the additional attribute 406 (e.g., AA(1)-AA(N)). If not, at 508, the counter (N) can again be incremented by one to calculate the AAAS for the next value of the additional attribute 406—in this case AAAS(2) for AA(2), or "software simulation software". This iterative process can continue until an AAAS has been calculated for all possible values of the additional attribute 406 (AA(1)-AA(N)).

After all values for AAAS have been calculated, the value for the additional attribute 406 for the first bug report 402 will be set to the highest value, AASN$_{MAX}$. This does not, in itself, ensure that AASN$_{MAX}$ is sufficiently high, however, to approve the additional attribute 406 for the first bug report 402. In other words, in some cases, the AAAS for two different values (e.g., AA(2) and AA(4)) may be very similar (e.g., 32% and 34%, respectively) and both values may be less than a threshold value (e.g., 50%).

To this end, as shown in FIG. 5B, when AASN$_{MAX}$ has been calculated, the method 500 can further determine if AASN$_{MAX}$ is above a predetermined threshold (e.g., above 50, 60, 70, 80, or 90%). In other words, whether there is sufficient confidence in AASN$_{MAX}$ to automatically assign a particular value to the additional attribute 406, or not. If, for example, AASN$_{MAX}$ is below 50%, for example, then it may be as likely as not that the value (AA$_{MAX}$) associated with AASN$_{MAX}$ is incorrect. If AASN$_{MAX}$ is 95%, on the other hand, it is highly likely that AA$_{MAX}$ is correct. In this case, AASN$_{MAX}$ may be automatically assigned to the first bug report 402 without further review.

At 518, therefore, the method 500 can determine if AASN$_{MAX}$ is above a predetermined threshold. If t AASN-$_{MAX}$ is very high, for example, then the first bug report 402 like has very similar attributes 118 to other bug reports associated with AA$_{MAX}$ (e.g., bug reports found when "no software" was running). If AASN$_{MAX}$ is lower, on the other hand, there may be more than one possible value for the additional attribute 406, or the additional attribute 406 may be ambiguous or indeterminate from the available data for the first bug report 402.

In some examples, the threshold for AASN$_{MAX}$ may be based on how crucial the additional attribute 406 is. In other words, if the additional attribute 406 is safety related or is related to a costly part, for example, the threshold may be set to a higher level (e.g., above 90%). If the additional attribute 406 is less crucial or is somewhat subjective, on the other hand, then the threshold can be anything above 50%, for example.

The threshold can be set by the user 102, for example, or can be adjusted based on user interaction data 320. In other words, the method 500 can receive user interaction data 320 related to whether the additional attribute 406 is being correctly assigned by the machine learning engine 122. If a high number of errors are reported, for example, the method 500 can set the threshold to a higher level (e.g., 90%). If, on the other hand, the user interaction data 320 indicates a high accuracy rate (e.g., 100%), the threshold may be set to a lower level until at least some errors are detected. Setting the threshold to a lower value may reduce the number of error messages—that may have to be reviewed manually—among other things.

At 520, if $AASN_{MAX}$ is above the threshold, then the additional attribute 406 for the first bug report 402 can be approved for $AA_{MAX}$ (e.g., "no software" or "flight simulation software"). Thus, regardless whether the first big report 402 already contained this value, contained the wrong value, or did not contain a value (e.g., the additional attribute 406 is a new category or was left blank on the first bug report 402) the additional attribute 406 can be automatically added to the first bug report. In this examples, if $AASN_{MAX}$=AAAS (1), then the additional attribute 406 can automatically be set to AA(1)—"no software."

At 522, if, on the other hand, $AASN_{MAX}$ is not above the threshold (e.g., $AASN_{MAX}$ is below 50%) the method 500 can generate an exception report, error code, or otherwise mark the first bug report 402 for additional review. In some cases, the method 500 can leave the additional attribute 406 as-is or blank, subject to additional review, to enable a user to manually add the additional attribute 406. In other examples, the method 500 can set the additional attribute 406 to $AA_{MAX}$ despite the low score, but also create the error report to enable a user to verify or change the additional attribute 406, as necessary. In some examples, all bug reports that cannot be automatically labeled (i.e., $AASN_{MAX}$ is below the threshold) can be placed in a cue and periodically reviewed by the user 102. In these cases, the user 102 may be able to manually assign a value to the additional attribute 406 or may be able to gather additional information (e.g., talk to the person who filed the first bug report 402), among other things.

Of course, for the sake of explanation, the method 500 is described above with respect to the first bug report 402. The method 500 could obviously be used iteratively to automatically assign (or correct) the additional attribute 406 to all "first bug reports"—e.g., all bug reports that have not yet been analyzed. In this manner, the method 500 can use the machine learning model 116 created using a relatively small number of training bug reports 114 to classify thousands or millions of other bug reports automatically. Thus, the method 500 can enable an entire database of bug reports, which may have been collected over years, to be "mined" for additional information.

FIGS. 1A-B, 2, 3A, 4, and 5A-B are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Examples of the present disclosure can also include a GUI 600 to enable users to record bug reports. As mentioned above, the bug reports can contain bug text data 318 and bug image data 314. In some examples, the GUI 600 can provide facilities to enable the user to enter bug image data 314. In some examples, as shown, the bug image data 314 can include freeze frame data 602 from an operating system (OS), simulation software, control system, or another source. In some examples, the freeze frame data 602 can be automatically generated in response to an error code or diagnostic code being triggered. In other examples, the bug image data 314 can also include a screenshot, camera image, video, or other bug image data 314 taken automatically or manually that relates to the bug being reported.

In some cases, the GUI 600 can also include a plurality of fields 604 to enable users to enter relevant bug text data 318 such as, for example, the project name, the person entering the bug report, the status, the costs, etc. The GUI 600 could also include more, less, or different fields 604. In some cases, the fields 604 can be customized for each project, each team or department, or each stage of development.

As mentioned above, text and image data can be extracted from the bug report using, for example, the image processing module 304 and the text processing module 218. In some examples, the freeze frame data 602, for example, or a screenshot can be provided in an image file (e.g., a .jpeg or .bmp), but can be processed by the image processing module 304 when appropriate to extract bug text data 318. In other cases, the bug image data 314 can comprise an image from a camera or sensor and can be analyzed by the image processing module 304 to determine one or more conditions (e.g., altitude, time of day, weather, etc.) that were present when the bug occurred.

In some examples, as mentioned above, the bug association system 106 can compare the bug image data 314 to the bug text data 318 to locate errors and/or inconsistencies. As shown, if the user enters "Systems Integration" into the "Team" field 604a, for example, the first bug attribute 404 may be set as, "Systems Integration." If the system recognizes the bug image data 314 as being from a different stage of development, however, this may lower the confidence score, for example, or trigger the bug report for manual review. This may occur when the user enters "Systems Integration," for example, but the freeze frame data 602 is from flight simulation software. In this manner, while most bug reports can be automatically classified and analyzed, anomalies can also be identified and corrected.

Referring to FIG. 6, in some examples, a GUI 600 can include one or more additional features. The GUI 600 can include, for example, a save button 606 to enable the user to save the bug report when it is complete. The GUI 600 an also include a clear button 608 to enable the user to clear the form and enter a new bug report. In some examples, the GUI 600 can also include an attach button 610 to enable the user to attach additional files to the bug report. This can include freeze frame data 602, for example, screenshots, images, log files, error logs, etc.

As mentioned above, even when using a convenient GUI 600, the bug reports can nonetheless contain erroneous information. This may be due to typos in the bug reports, spaces left blank, and data entry errors, among other things. Of course, regardless of their source, all of these errors are detrimental to the advancement of the development process.

Using the systems and methods described herein, however, can correct errors, fill in blanks, and even add new data to the bug reports. As has been mentioned, while a particular set of bug reports may not contain a particular piece of data, it may nonetheless be discernable from the available data. Bug reports filed by people on the systems integration team, for example, are more likely to be reporting bugs discovered during the systems integration portion of development. Data in the bug report from a flight simulator can indicate that the bug was reported during flight simulation. Indeed, data in multiple reports from the flight simulator may indicate a problem with the flight simulation software itself. Similarly, if data from a particular motor controller appears in multiple bug reports across multiple stages of the development process, the motor controller rather than the process may be at issue.

Continuing with the examples discussed above, the systems and methods described herein can be used to add a new data point, or attribute 118, to a large number of bug reports that did not previously include this data point. By manually training the machine learning model 116, the method 500 discussed above, for example, can be used to add a data point, or attribute 118, related to when the bug was found ("When Found"). This data, in turn can be used to pinpoint where in the complex development and manufacturing process, additional testing and validation may be warranted.

Figure 7:
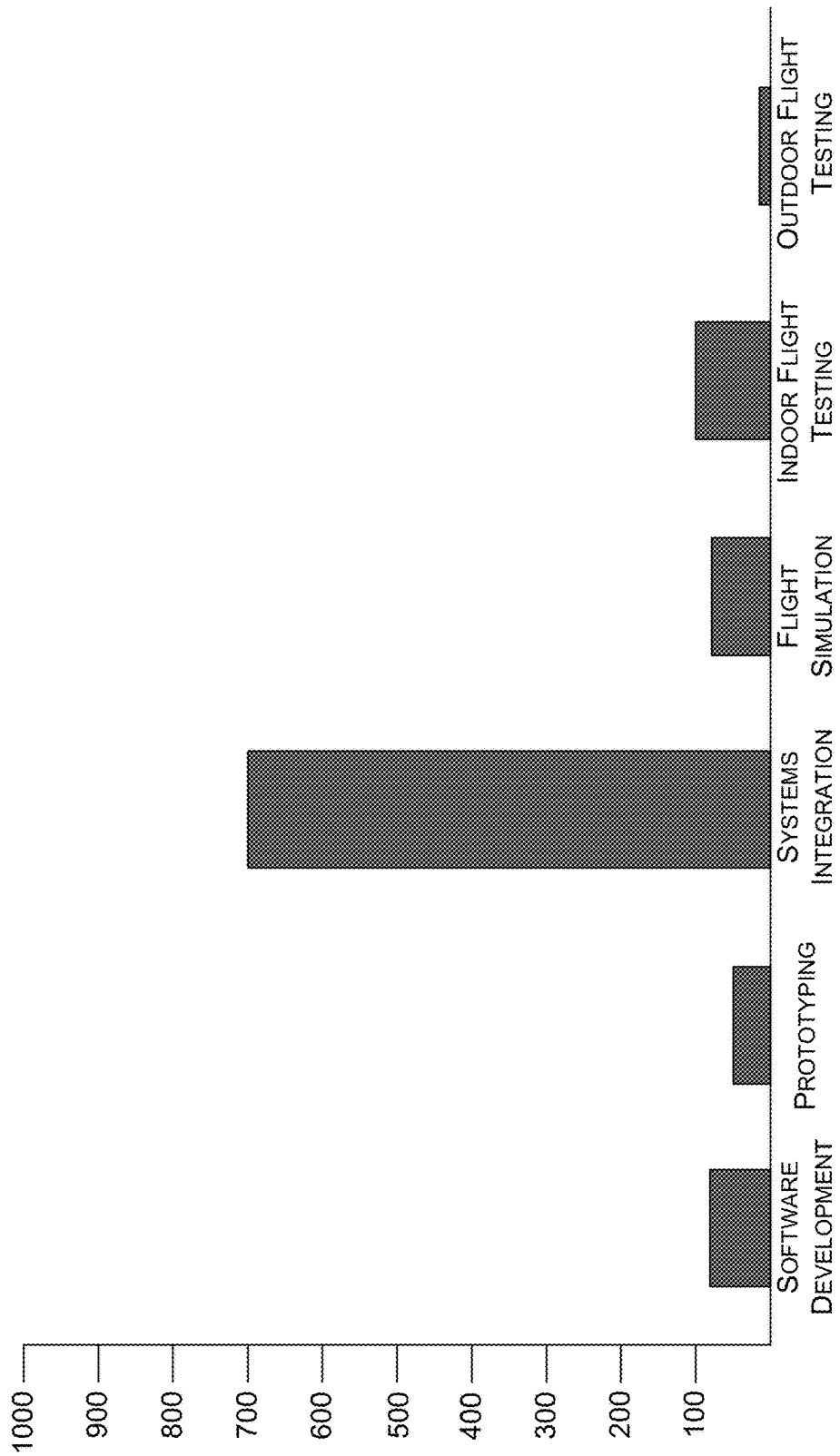
FIG. 7 is an example graph identifying a stage of development with a majority of associated bug reports, in accordance with some examples of the present disclosure.

An example is shown in FIG. 7, where 1000 bug reports have been automatically classified with the new When Found attribute 118. This category has then been graphed for all possible values of When Found, which corresponds to any stage of development when a bug report was filed. In reality, this would probably include all of the stages of development, because at least some bugs are likely to have been found at each stage of development.

In this hypothetical case, some 70% of bugs are reported during Systems Integration. Thus, while this information was not previously available, it is now readily apparent that there are issues related to Systems Integration. Of course, the problem could lie in a previous stage of development, but the system has nonetheless provided information useful in finding and fixing the issue. In addition, the system has enabled the classification (e.g., the addition of a new attribute) of a large number of bug reports that previously may have been too numerous to classify by hand.

While several possible examples are disclosed above, examples of the present disclosure are not so limited. For instance, while systems and methods for use with product development are disclosed, the systems and methods could be used in other environments without departing from the spirit of the disclosure. In addition, the location and configuration used for various features of examples of the present disclosure such as, for example, the location and configuration of the various UIs, bug categories, and attributes types could be changed based on a specific product or manufacturing type. So, for example, any or all of these components of the system could be different for a bicycle manufacturer, for example, when compared to a UAV manufacturer. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
one or more processors;
one or more inputs; and
memory storing computer-executable instructions that, when executed, cause the one or more processors to perform acts comprising:
retrieving a plurality of training bug reports from a bug report database;
analyzing the plurality of training bug reports;
assigning a plurality of initial attributes to individual training bug reports of the plurality of training bug reports;
retrieving individual values for attributes in the plurality of initial attributes assigned to a bug report of the plurality of training bug reports;
analyzing the plurality of initial attributes to determine a first plurality of additional attributes associated with the individual training bug reports, wherein values of the first plurality of additional attributes are not included in the individual training bug reports, and further wherein at least one of the first plurality of additional attributes identifies a stage of development of the individual training bug reports;
receiving, from a user at the one or more inputs, first values for the first plurality of additional attributes associated with the individual training bug reports;
creating a machine learning model associating the first plurality of additional attributes to the plurality of initial attributes for the individual training bug reports;
retrieving a first bug report from the bug report database;
analyzing, by the machine learning model, the first bug report to identify second values for a plurality of attributes in the first bug report and a second plurality of additional attributes that are different from the plurality of initial attributes, wherein the second values are not included in the first bug report;
calculating, by a machine learning engine using the machine learning model, an additional attribute association score (AAAS) for individual values of an additional attribute of the second plurality of additional attributes associated with the first bug report;
and assigning a first value to the additional attribute for which the AAAS is highest to the first bug report.

2. The system of claim 1, the acts further comprising:
determining that the AAAS is above a pre-determined threshold; and
automatically assigning the first value to the additional attribute in the first bug report.

3. The system of claim 1, the acts further comprising:
determining that the AAAS is below a pre-determined threshold;
automatically assigning the first value to the additional attribute in the first bug report; and
creating an error report indicating that the AAAS is below the pre-determined threshold.

4. The system of claim 1, the acts further comprising:
determining that the AAAS is below a pre-determined threshold;
automatically assigning a null value to the additional attribute in the first bug report; and
creating an error report indicating that the AAAS is below the pre-determined threshold.

5. The system of claim 1,
wherein the values for the additional attributes are chosen from one of software development, systems integration, flight simulation, indoor flight testing, or outdoor flight testing.

6. A method comprising:
retrieving individual values for attributes in one or more initial attributes assigned to a first a bug report of a plurality of bug reports;
analyzing, by a machine learning engine, first image data, first binary data, and first text data associated with the first bug report;
identifying, by the machine learning engine, one or more first additional attributes of the first bug report by extracting first values for the one or more first additional attributes, wherein the first values include at least one of a project name, a team or department, a person associated with reporting a first bug, or a brief description of the first bug from at least one of the first image data, the first binary data, or the first text data;
analyzing, by the machine learning engine, the one or more attributes of the first bug report to determine second values for one or more second additional attributes associated with the first bug report, wherein the second values of the one or more second additional attributes are not included in the first bug report, the one or more second additional attributes being different from the one or more first additional attributes, wherein at least one of the one or more second additional attributes identifies a stage of development associated with the first bug report;
calculating, by the machine learning engine and based on a machine learning model, an additional attribute association score (AAAS) for individual values of an additional attribute of the one or more second additional attributes associated with the first bug report; and
identifying a first value for the additional attribute for the first bug report for which the AAAS is highest.

7. The method of claim 6, further comprising:
providing, via one or more outputs, the first value for the additional attribute and the AAAS to a user.

8. The method of claim 6, further comprising:
determining that the AAAS for the first value is above a predetermined threshold; and
automatically assigning the first value for the additional attribute in the first bug report with the machine learning engine; and
saving the first bug report with the additional attribute to a bug report database.

9. The method of claim 6, further comprising:
determining that the AAAS for the first value is below a predetermined threshold;
identifying a second value for the additional attribute for the first bug report for which the AAAS is a second highest value; and
creating an error report containing the first value and the second value and a respective AAAS for the first value and the second value to enable a user to manually add the additional attribute to the first bug report.

10. The method as recited in claim 6, further comprising:
analyzing, by the machine learning engine, training image data, training binary data, and training text data for individual training bug reports of a plurality of training bug reports;
identifying third values for a plurality of attributes for the individual training bug reports from the training image data, the training binary data, and the training text data;
receiving, from a user via one or more inputs, a second value for at least one additional attribute for each of the plurality of training bug reports; and
creating the machine learning model associating the second value for the at least one additional attribute to the third values for the plurality of attributes for the individual training bug reports.

11. The method of claim 6, wherein the first value for the additional attribute comprises one of: initial development, software development, systems integration, flight simulation, indoor flight testing, or outdoor flight testing.

12. The method of claim 10, wherein the at least one additional attribute comprises an identity of software running at a time at which the first bug associated with a training bug report occurred; and
wherein the first value for the additional attribute comprises one of: computer aided design (CAD)/computer aided manufacturing (CAM) software, flight simulation software, or flight control software.

13. The method of claim 6, wherein the first image data comprises one or more screenshots from at least one piece of software running at a time the first bug associated with the first bug report occurred.

14. The method of claim 6, wherein the first binary data comprises a data dump from at least one piece of software running at a time the first bug associated with the first bug report occurred.

15. A system comprising:
a user interface to receive inputs from a user;
one or more outputs to provide outputs to the user;
one or more processors;
a bug report database comprising at least a plurality of training bug reports and a plurality of bug reports; and
memory storing computer-executable instructions that, when executed, cause the one or more processors to:
retrieve the plurality of training bug reports from the bug report database;
extract from individual training bug reports of the plurality of training bug reports a plurality of initial attributes;
retrieve individual values for attributes in the plurality of initial attributes assigned to a bug report of the plurality of training bug reports;
analyzing the plurality of initial attributes to determine a first plurality of additional attributes associated with the individual training bug reports, wherein values of the first plurality of additional attributes are not included in the individual training bug reports, and further wherein at least one of the first plurality of additional attributes identifies a stage of development of the individual training bug reports;
receive, via the user interface, a selection of first values for the first plurality of additional attributes associated with the individual training bug reports;
create a machine learning model associating the first values for the first plurality of additional attributes to the plurality of initial attributes for the individual training bug reports;
retrieve the plurality of bug reports from the bug report database; and analyze, by the machine learning model, the bug report of the plurality of bug reports to identify second values for a second plurality of additional attributes that are different from the plurality of initial attributes, wherein the second values are not included in the bug report.

16. The system of claim 15, the memory further causing the one or more processors to:
calculate an additional attribute association score (AAAS) for individual values for an additional attribute of the second plurality of additional attributes for the bug report;
select the value for the additional attribute that has a highest AAAS score;
assign the value to the additional attribute in the bug report; and
save the bug report in the bug report database with the value for the additional attribute.

17. The system of claim 15, the memory further causing the one or more processors to:
calculate an association score for a plurality of values for a first attribute of the second plurality of additional attributes;
select a first value for the first attribute that has a highest association score; and
compare the first value for the first attribute that has the highest association score to a current value for the first attribute.

18. The system of claim 17, wherein the first value for the first attribute that has the highest association score and the current value for the first attribute are the same, the memory further causing the one or more processors to:
save the bug report with the current value for the first attribute in the bug report database.

19. The system of claim 17, wherein the first value for the first attribute that has the highest association score and the current value for the first attribute are different, the memory further causing the one or more processors to:
update the current value for the first attribute to the first value for the first attribute that has the highest association score; and
save the bug report with the first value for the first attribute that has the highest association score in the bug report database.

20. The system as recited in claim 15, wherein the user interface displays a when found attribute associated with the stage of development at which a bug occurred; and
wherein the when found attribute comprises a value selected from one or more of: initial design and brainstorming, CAD/CAM design, coding, systems integration, simulation, indoor flight testing, cage flight testing, or outdoor flight testing.

* * * * *